No. 820,333. PATENTED MAY 8, 1906
H. ARON.
ELECTRICITY METER FOR ALTERNATING CURRENTS.
APPLICATION FILED MAY 27, 1904.

WITNESSES.

INVENTOR.
Hermann Aron,
By Henry J. Miller,
HIS ATTORNEY.

UNITED STATES PATENT OFFICE.

HERMANN ARON, OF CHARLOTTENBURG, GERMANY.

ELECTRICITY-METER FOR ALTERNATING CURRENTS.

No. 820,333.   Specification of Letters Patent.   Patented May 8, 1906.

Application filed May 27, 1904. Serial No. 210,022.

*To all whom it may concern:*

Be it known that I, HERMANN ARON, a citizen of the Empire of Germany, residing at Charlottenburg, 39 Wilmersdorferstrasse, in the Kingdom of Prussia and Empire of Germany, have invented certain new and useful Improvements in Electricity-Meters for Alternating Currents, of which the following is a specification.

My invention has for its object to provide an improved electricity-meter for alternating currents, which electricity-meter is more especially intended for use in electric installations in which the maximum current is low. In such cases a cheap and yet reliable meter is required, as, on the one hand, the hire of the meter should not materially increase the price of the current, while, on the other hand, small electrical installations can only be remunerative if the consumption of current be accurately recorded. The alternate-current meter constituting my present invention fulfils these two requirements, while it is very accurate and simple in construction.

Figure 1:
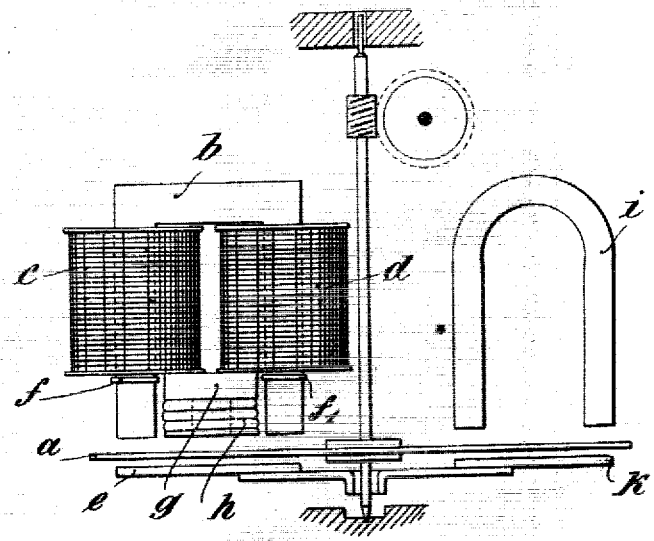
Figure 2:
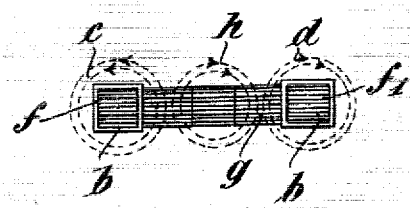

I will describe my invention with reference to the accompanying drawings, representing, in side elevation in Figure 1, an apparatus made in accordance therewith. Fig. 2 is a partial plan.

The meter comprises a revolving body $a$, which in its simplest form consists of a disk of good conducting material—such, for example, as copper or aluminium. Over this disk is arranged a horseshoe-electromagnet $b$, the core of which is more or less subdivided or laminated and energized by shunt-coils $c$ and $d$. On the other side of the disk $a$ and opposite to the said electromagnet $b$ is arranged an armature $e$. In order that this meter may be used in installations in which inductive loads occur, there should be, as is well known, a phase difference of about ninety degrees between the lines of force produced by the shunt-coils and the series coil, this phase difference being, for instance, obtained by the arrangement of a short circuited copper winding or windings $ff'$ on the limbs of the electromagnet $b$ and by an imperfectly magnetic bridging-piece $g$, of laminated iron, arranged between the poles of the electromagnet $b$ and carrying a small series coil $h$, traversed by the main current. This simple and compact arrangement produces in front of the poles of the electromagnet $b$ two unsymmetrical magnetic fields having a phase difference of about ninety degrees relatively to each other and of such direction that they tend to rotate the revolving body $a$ in that same direction. The momentum imparted by this rotating field to the disk $a$ is absorbed both by the aforesaid electromagnet $b$ and by a magnetic brake consisting of a magnet $i$, arranged on the same side of the disk $a$ as that on which the said electromagnet $b$ is situated. Underneath the side of the disk $a$, diametrically opposite the armature $e$, is an armature $k$, opposite the magnet $i$. Besides its simplicity of construction, which permits of the main current or series coil $h$ being arranged on the bridging-piece $g$, this meter arrangement presents also the advantage that the braking action of the electromagnet $b$ on the revolving disk is the same under all loads, for one of the poles of the electromagnet is as much strengthened by the field produced by the series coil as the other pole is weakened thereby. The indications of the meter remain, therefore, proportional to the consumption of energy through the whole range of the measurements for which it is intended.

What I claim, and desire to secure by Letters Patent, is—

1. In an alternating-current electricity-meter, the combination with a rotary member and an armature disposed on one side of the same, of a pair of shunt magnet-coils upon the opposite side of said rotary member provided with cores magnetically connected at the ends farthest from said rotary member, one or more short-circuited coils for varying the relative phases of current in said magnet-coils, a bridge-piece between the opposite ends of said magnet-cores adapted to form therewith an imperfect magnetic circuit, and a series magnet-coil carried by said bridge-piece.

2. In an alternating-current electricity-meter, the combination with a rotary member and an armature disposed on one side of the same, of a pair of shunt magnet-coils upon the opposite side of said rotary member provided with cores magnetically connected at the ends farthest from said rotary member, one or more short-circuited coils for varying the relative phases of current in said magnet-coils, a bridge-piece between the opposite ends of said magnet-cores adapted to form therewith an imperfect magnetic circuit, a series magnet-coil carried by said bridge-piece, and a magnetic brake comprising a permanent magnet and an armature disposed on opposite sides of said rotary member.

In witness whereof I subscribe my signature in presence of two witnesses.

HERMANN ARON.

Witnesses:
 HENRY HASPER,
 WOLDEMAR HAUPT.